United States Patent [19]
Collins, Jr.

[11] Patent Number: 4,470,629
[45] Date of Patent: Sep. 11, 1984

[54] ADJUSTABLE VEHICLE SEAT

[75] Inventor: William T. Collins, Jr., Bloomfield Hills, Mich.

[73] Assignee: Vixen Motor Company, Pontiac, Mich.

[21] Appl. No.: 386,608

[22] Filed: Jun. 9, 1982

[51] Int. Cl.³ .................... A47C 13/00; B60H 1/10
[52] U.S. Cl. ............................ 297/64; 297/67; 297/103
[58] Field of Search .............. 297/64, 67, 66, 94, 297/103, 110, 111

[56] References Cited

U.S. PATENT DOCUMENTS

| | | | |
|---|---|---|---|
| 188,167 | 3/1977 | Mitchell | 297/64 X |
| 696,190 | 3/1902 | Potter | 297/64 |
| 2,383,178 | 8/1945 | Edwards | 297/94 X |
| 2,738,829 | 3/1956 | Rowe | 297/103 X |
| 3,171,682 | 3/1965 | Buser et al. | 296/66 |
| 3,473,840 | 10/1969 | Miles | 296/69 |
| 3,887,229 | 6/1975 | Plume | 297/65 |
| 3,897,104 | 7/1975 | Black | 297/353 |
| 3,913,152 | 10/1975 | Quakenbush | 5/37 R |
| 3,964,785 | 6/1976 | Plume | 297/64 |
| 4,001,901 | 1/1977 | Quakenbush | 5/37 R |
| 4,085,962 | 4/1978 | Wahls | 296/65 R |
| 4,099,768 | 7/1978 | Amos | 297/63 |
| 4,170,800 | 10/1979 | Wiberg | 5/45 |
| 4,186,960 | 2/1980 | Mizelle | 297/63 |
| 4,322,052 | 3/1982 | Hodge et al. | 297/94 X |

Primary Examiner—James T. McCall
Attorney, Agent, or Firm—Basile, Weintraub & Hanlon

[57] ABSTRACT

An adjustable vehicle seat including first and second seat members pivotally interconnected such that the second seat member is pivotally movable between first and second opposed direction facing positions at opposed ends of the first seat member. An angular adjustment mechanism is associated with the interconnected first and second seat members and enables the angular relationship of the second seat member to be selectively adjusted with respect to the first seat member in a plurality of angular positions. A latch is provided for latching the second seat member in a fixed position when the second seat member is oriented in the first direction facing position.

6 Claims, 8 Drawing Figures

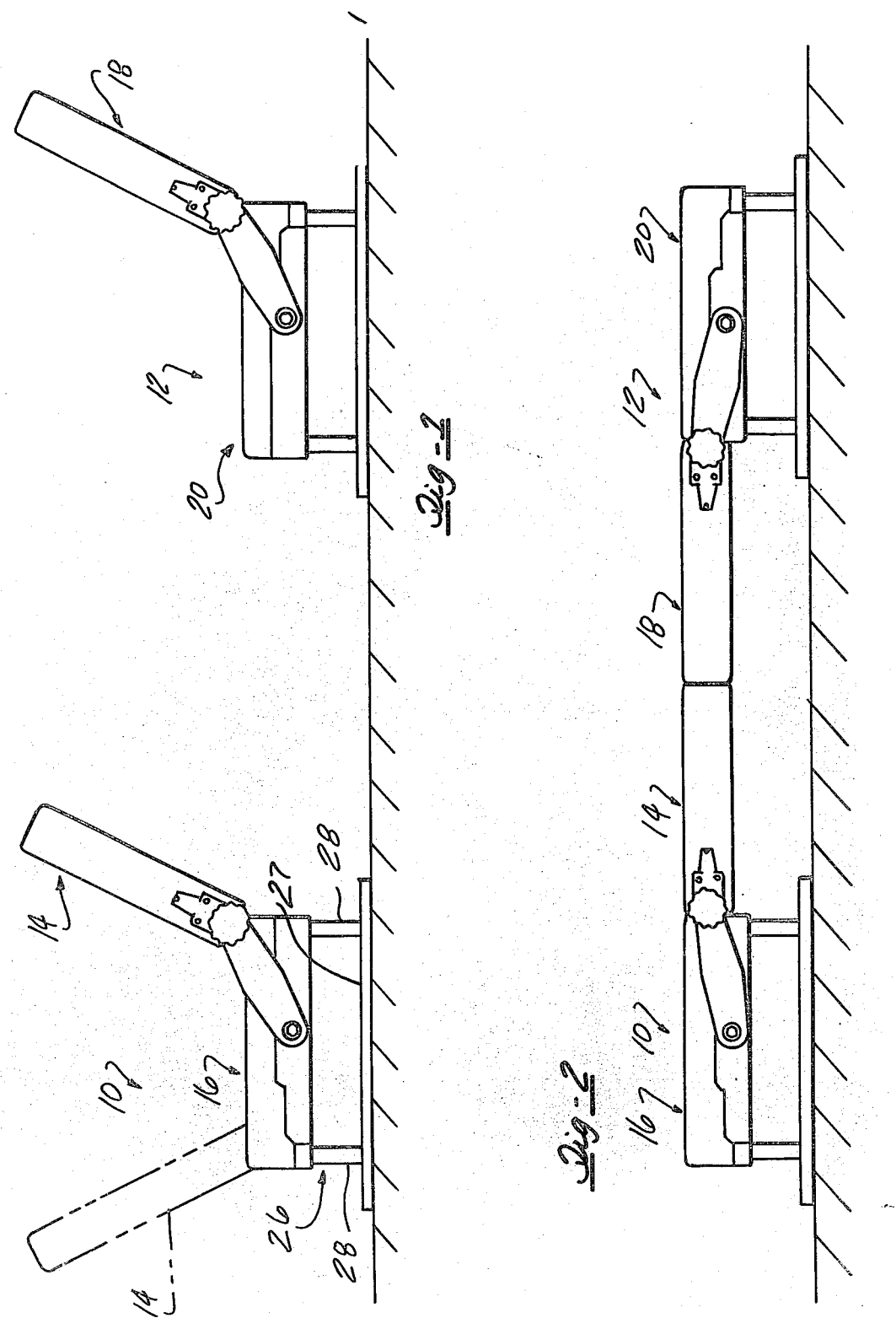

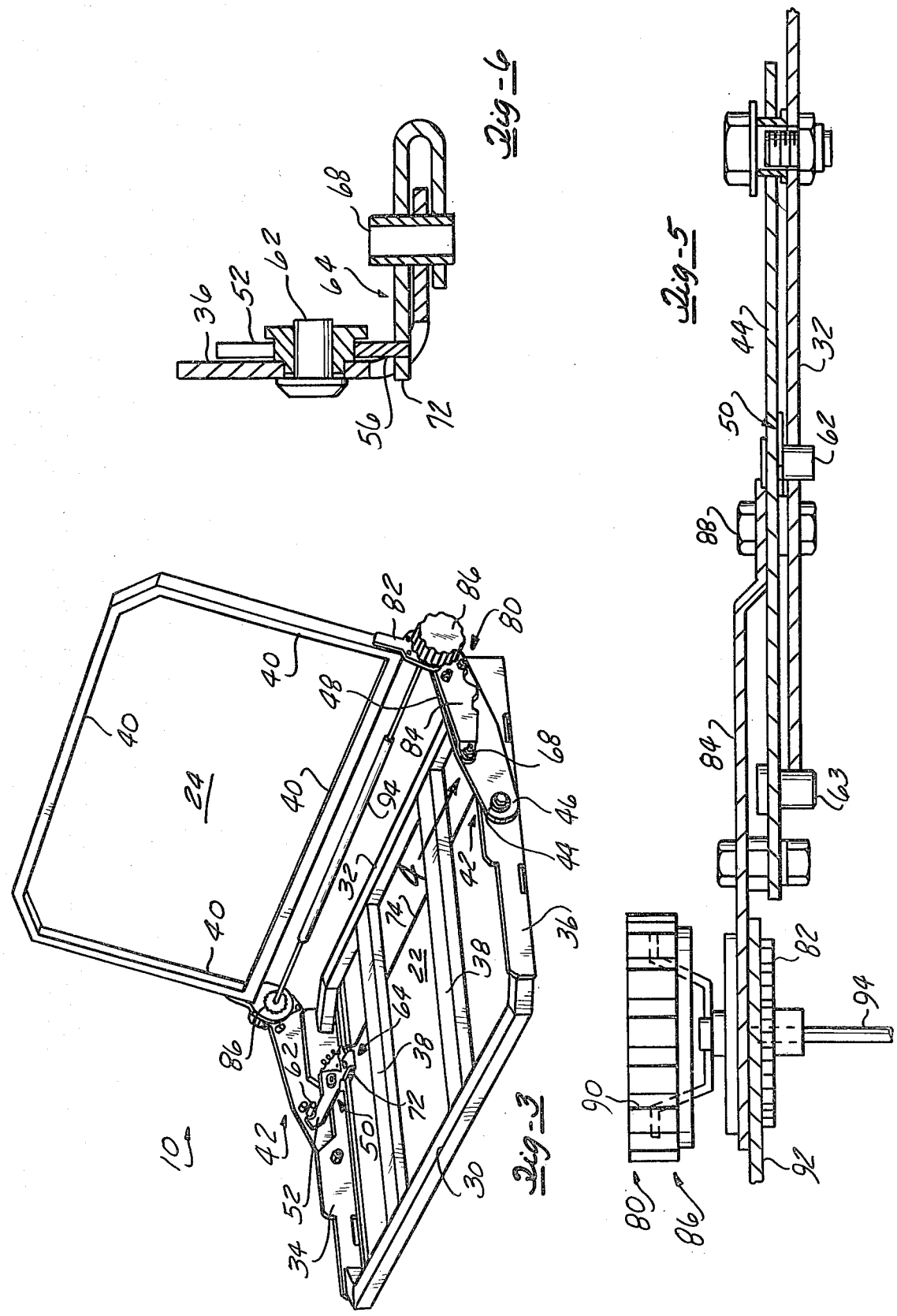

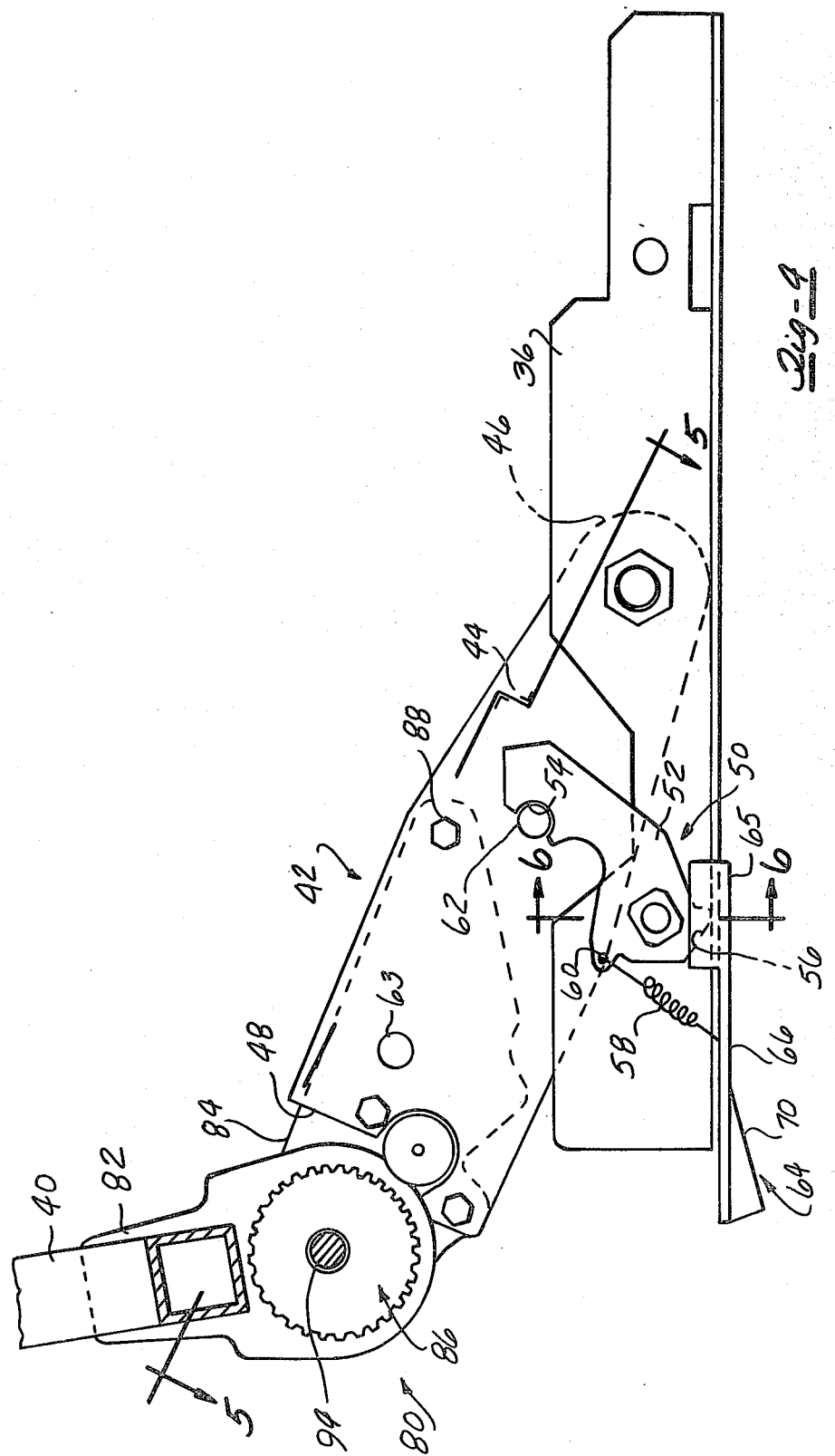

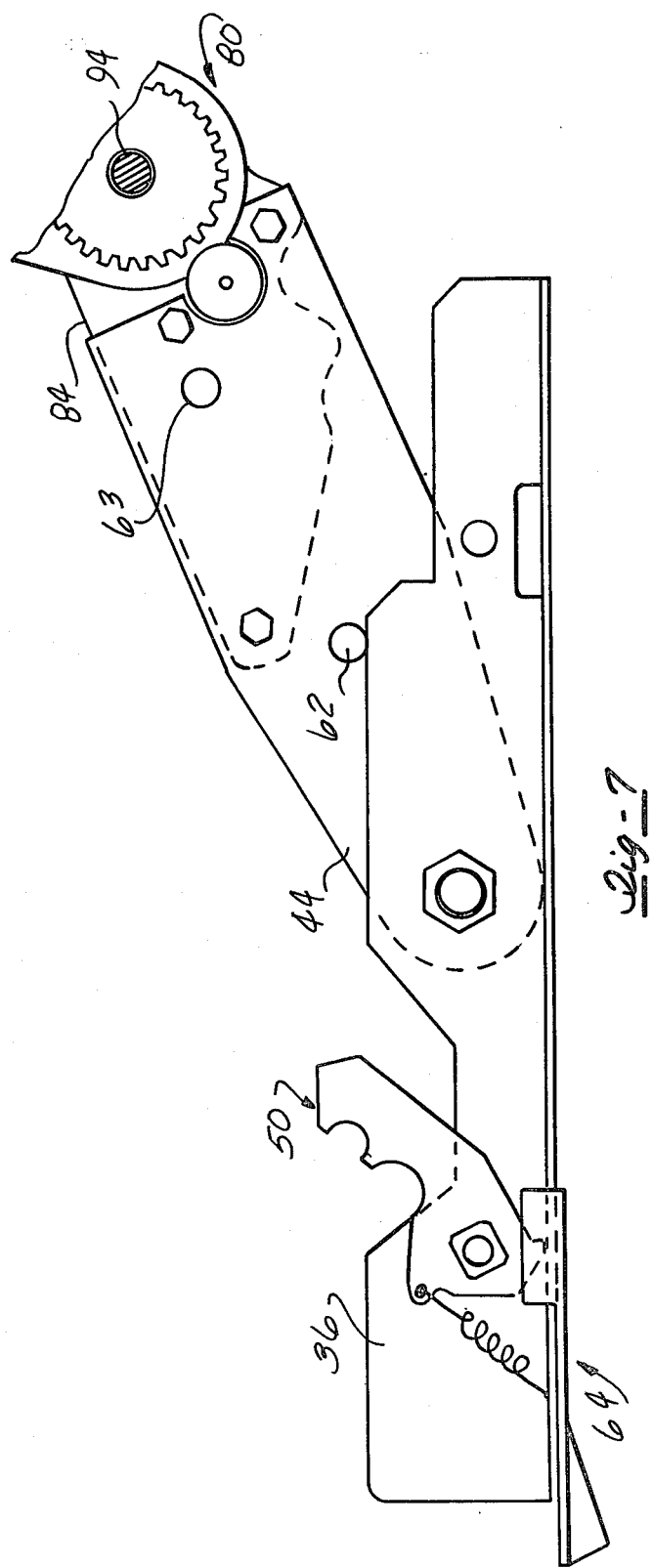

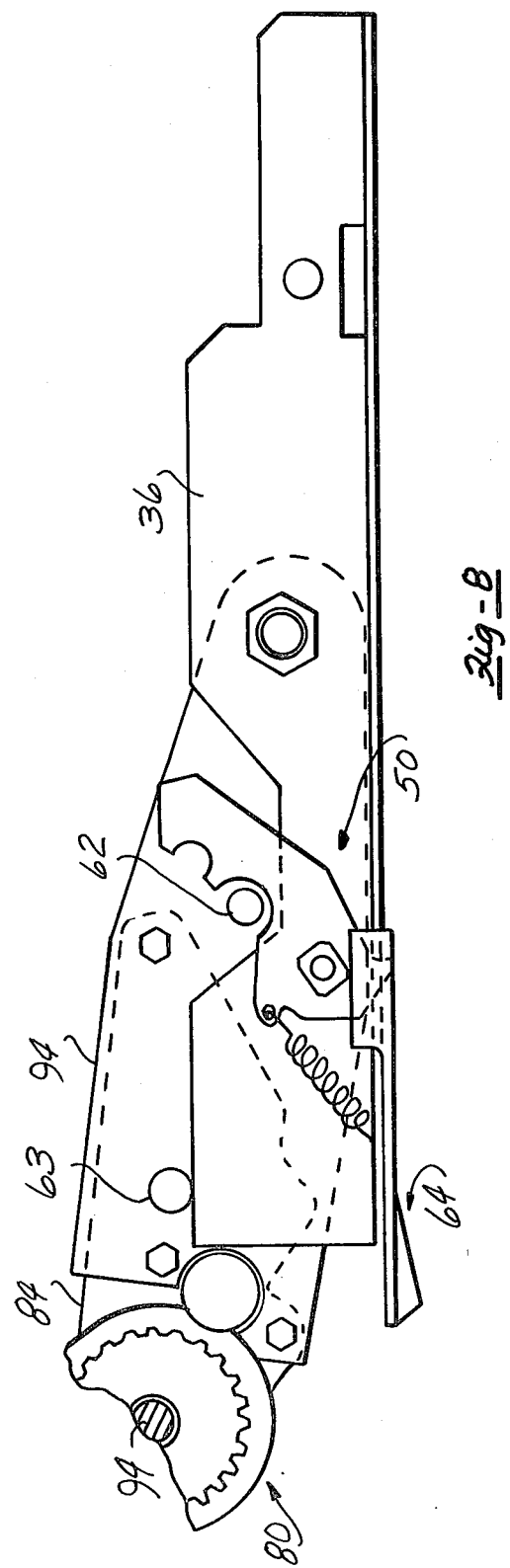

ADJUSTABLE VEHICLE SEAT

BACKGROUND OF THE INVENTION

1. Field of the Invention

This invention relates, in general, to seats and, specifically, to vehicle seats which are convertible from a seat to a bed position and, more specifically, to vehicle seats which are convertible from a seat to a bed position and in which the seat back is pivotal between forward and rearward facing directions.

2. Description of the Prior Art

Seats and, particularly, vehicle seats, have been provided with various adjustable mechanisms which enable the angular position of the seat back to be selectively adjusted with respect to the seat bottom. This feature is particularly useful for a driver's seat in order to conform the seat to different sized individuals, different driving habits, as well as to reduce fatigue on long trips.

Such adjustable seats have also found widespread use in motor homes, vans and campers, etc., where interior space is at a premium and a seat must perform a variety of different functions, i.e., seating, sleeping and/or dining.

Such convertible seats have also been constructed for adjustment between a seating position and a horizontal position. Provisions have also been provided for slidingly moving such seats when in the horizontal position so as to abut an adjacent seat in order to form an elongated bed.

Vehicle seats have also been constructed which are convertible between forward and rearward facing directions. This type of convertible seat is typically employed in motor homes, campers, vans, etc., as a front passenger seat which is convertible from a forward facing direction to a rearward facing direction for dining, game playing, etc.

However, such previously designed adjustable and convertible seats have utilized relatively complex linkages and adjusting mechanisms to attain the adjustable and convertible features. This has resulted in a complex mechanism requiring a large number of components and a considerable amount of interior space. This has also resulted in a larger sized seat which has limited the effective use of such seats since present day vehicles are being reduced in size and weight for economy reasons.

Thus, it would be desirable to provide a vehicle seat which overcomes the problems of similar prior art vehicle seats. It would also be desirable to provide a vehicle seat in which the seat back is convertible between forward and rearward facing directions. It would also be desirable to provide a vehicle seat in which the seat back is convertible between forward and rearward facing directions and, at the same time, may be adjusted in angular relationship with respect to the seat bottom in either of the forward or rearward facing positions. Finally, it would be desirable to provide a convertible and adjustable seat which employs a simple convertible and adjustable mechanism requiring few components and a small amount of space within the interior of the vehicle.

SUMMARY OF THE INVENTION

There is disclosed herein a unique seat adapted for use in vehicles, such as motor homes, campers, vans, etc., which provides both convertible and adjustable features such that the seat back may be pivotally moved between forward and rearward facing directions at opposite ends of the seat bottom and, further, may be adjusted in angular relationship with respect to the seat bottom from a plurality of upright positions to a horizontally disposed bed position.

In the vehicle seat of the present invention, first and second seat members corresponding to a seat bottom and seat back are mounted on support frames which are pivotally interconnected by a suitable interconnecting mechanism in a predetermined angular relationship such that the seat back may be selectively moved between first and second opposed direction facing positions at opposite ends of the seat bottom. Angular adjustment means are coupled ith the interconnecting means to enable the angular relationship of the seat back to be selectively adjusted with respect to the seat bottom between a variety of upright positions and a horizontal bed position. A latch mechanism is mounted on the seat bottom frame and is operative to latch the seat back in a fixed position when the seat back is disposed in a first forward facing direction within a vehicle.

For larger width seats, a pair of identical interconnecting mechanisms are mounted on opposed sides of the seat back and seat bottom. Identical angular adjustment means and latch mechanisms are also provided on opposed sides of the seat back and seat bottom and interconnected for unitary movement.

The vehicle seat of the present invention uniquely provides convertible features in which the seat back may be pivotally moved between either of a first forward facing direction or a second rearward facing direction with respect to the seat bottom thereby enhancing the use of the vehicle seat in certain types of vehicles, such as campers, motor homes and vans, in which a seat, due to space restrictions, must perform a variety of functions, i.e., seating, dining and as a bed.

The unique vehicle seat of the present invention also includes an angular adjustment mechanism which enables the angular relationship of the seat back and seat bottom to be selectively varied such that the seat back may be moved between a variety of upright positions and a horizontally disposed position in line with the seat bottom.

The vehicle seat of the present invention provides both convertible and adjustable features with a unique interconnecting, adjustment and latch means of simplified construction such that the vehicle seat of the present invention may be manufactured with a relatively few number of components which reduces manufacturing costs and provide a vehicle seat which consumes a small amount of space within the interior of a vehicle.

BRIEF DESCRIPTION OF THE DRAWING

The various features, advantages and other uses of the present invention will become more apparent by referring to the following detailed description and drawing in which:

FIG. 1 is a pictorial representation of two vehicle seats constructed in accordance with the teachings of the present invention which are mounted in a spaced apart manner within a vehicle;

FIG. 2 is a pictorial representation of the two vehicle seats of FIG. 1 oriented in an abutting bed position;

FIG. 3 is a perspective view of the vehicle seat of the present invention;

FIG. 4 is an elevational view of the latch and interconnecting mechanisms, generally taken in the direction of arrow 4 in FIG. 3;

FIG. 5 is a cross sectional view generally taken along line 5—5 in FIG. 4;

FIG. 6 is a cross sectional view generally taken along line 6—6 in FIG. 4;

FIG. 7 is a partial elevational view of the latch and interconnecting means illustrating the position of the various components when the vehicle seat is in the rearward facing direction in a vehicle; and FIG. 8 is a partial elevational view of the latch and interconnecting means when the vehicle seat is oriented in a bed position.

DESCRIPTION OF THE PREFERRED EMBODIMENTS

Throughout the following description and drawing, an identical reference number is used to refer to the same component shown in multiple figures of the drawing.

Referring now to the drawing, and to FIGS. 1, 2 and 3 in particular, there is illustrated a vehicle seat 10 constructed in accordance with the teachings of the present invention which is ideally suited for use in vehicles, such as campers, motor homes, vans, etc. The vehicle seat 10 is constructed with a seat back 14 and a seat bottom 16 which are interconnected such that the seat back 14 may be pivotally moved from a first direction facing position, such as a forward direction facing position when the vehicle seat position is mounted in a vehicle, as shown in solid in FIG. 1, to a second opposed direction facing position, such as a rearward facing position shown in phantom in FIG. 1. In addition, the vehicle seat 10 includes an angular adjustment mechanism which enables the angular position of the seat back 14 to be selectively adjusted with respect to the seat bottom 16 between a variety of upright positions and a horizontally aligned bed position, shown in FIG. 2 and described in greater detail hereafter.

Although the vehicle seat 10 of the present invention is useful by itself, additional advantages are obtained when two vehicle seats, such as vehicle seats 10 and 12 illustrated in FIG. 1, are mounted in a spaced-apart manner within a vehicle. The two vehicle seats 10 and 12 are substantially identical in construction, with only minor modifications being made on the rear seat 12, such as a reversal in the orientation of the rear seat bottom frame, as described in detail hereafter, being made in order to allow the rear seat 12 to be lowered to the horizontal bed position.

When in the configurations depicted in FIGS. 1 and 2, the forwardmost vehicle seat 10 may be used as a passenger seat within the vehicle when oriented in a forward facing direction and may be moved to a rearward facing direction for cooperative use with the rearmost vehicle seat 12 for dining, game playing, etc. In addition, as shown in FIG. 2, both vehicle seats 10 and 12 may be adjusted such that the respective seat backs 14 and 18 can be moved to a horizontally in line position with the corresponding seat bottoms 16 and 20 to form a bed.

Referring now to FIG. 3, there is illustrated a perspective view of one of the identical seats, such as vehicle seat 10, in which the seat back and seat bottom cushions have been removed in order to show the interior interconnecting and adjustment mechanisms.

The vehicle seat 10 includes first and second support frames 22 and 24 which respectively support the seat bottom and seat back cushions. The seat bottom frame 22 is adapted to be mounted directly to the floor of a vehicle or on a suitable sliding track mechanism, denoted in general by reference number 26 in FIG. 1.

As is conventional, the track mechanism 26 includes a pair of spaced apart tracks 27 mounted on the vehicle floor and spaced support brackets 28 which are slidingly mounted for fore and aft movement along each track 27. The uppermost ends of the support members 28, which may be of any length or not required at all, are connected by suitable fasteners to the seat bottom frame 22 of the vehicle seat 10.

As shown in FIG. 3, the seat bottom frame 22 is formed of tubular members including tubular members 30 and 32 and substantially L-shaped side members 34 and 36 which are interconnected into a unitary frame structure. A pair of spaced, horizontally disposed ribs 38 span the tubular members 30 and 32 to provide structural strength for the seat bottom support frame 22.

The seat back frame 24 is similarly constructed of four tubular members 40 which are joined at their ends into a unitary planar frame assembly.

As shown in FIG. 1, conventional seat back and seat bottom cushions are mounted on the respective seat back and seat bottom support frames 24 and 22. The cushions may be of any conventional form may and include underlying cushion support in the nature of springs, foam pads, etc., which are in turn covered by a decorative outer covering formed of plastic, leather, cloth, etc.

As shown in FIG. 3, and in greater detail in FIGS. 4, 5 and 6, the vehicle seat 10 is provided with an interconnecting means, denoted in general by reference number 42, for pivotally interconnecting the seat bottom and seat back frames 22 and 24 in a predetermined angular relationship such that the seat back may be selectively moved between first and second opposed direction facing positions at opposite ends of the seat bottom, as shown in FIG. 1. Due to the width of the vehicle seat 10 illustrated in FIG. 3, a pair of identically constructed interconnecting means 42 are provided on opposed sides of the seat bottom and seat back support frames 22 and 24. For purposes of clarity and brevity, the following discussion will describe the construction of only one of the pair of interconnecting means 42.

The interconnecting means 42 includes a planar link 44 which is pivotally connected at a first end 46 to the exterior of the side member 36 of the seat bottom support frame 22. The opposed second end 48 of the link 44 is pivotally connected to the seat back frame 24 by means which will be described in greater detail hereafter.

The link 44 enables the seat back support frame 24 to be pivotally moved between a first direction facing position in which the seat back support frame 24 is positioned adjacent the rear edge of the seat bottom support frame 22, as illustrated in FIG. 3, to a second, opposed direction facing position in which the seat back support frame 24 is positioned adjacent the opposite end of the seat bottom support frame 22 as will be described and illustrated in greater detail hereafter.

A latch means 50 is mounted on the seat bottom support frame 22 for latching the seat back support frame 24 in a fixed position when the seat back support frame 24 is oriented in the first direction facing position adjacent the rear edge of the seat bottom support frame 22. The latch means 50 comprises a latch member 52 which is pivotally connected to the side frame member 36 of the bottom support frame 22. The latch member 52 is connected with an arcuate notch 54 at an upper end and a depending detent 56 at a lower end.

A biasing means 58, preferably in the form of a coil spring, is connected between the side frame 36 and a projection 60 formed at an intermediate portion of the latch member 52 and operates to bias the latch member 52 upwards or to the left in the orientation depicted in FIG. 4.

First stop means 62, engageable with the notch 54 in the latch member 52 is provided for stopping pivotal movement of the seat back support frame 24. Preferably, the stop means 62 comprises a cylindrical pin which is mounted on the link 44. In this manner, when the seat back support frame 24 is positioned in the first direction facing position, as illustrated in FIGS. 3 and 4, the pin will engage the notch 54 in the latch member 52 to secure the seat back support frame 24 in a fixed position preventing further pivotal movement of the frame 24 in either direction.

A latch release means 64 is provided for selectively disengaging the latch member 52 from the stop pin 62 to enable the seat back support frame 24 to be pivoted to the opposed second direction facing position. Preferably, the latch release means 64 comprises an elongated lever 66 which is pivotally attached at a first end 65 by pivot pin 68 to the lower flange of the side support member 36 as shown in FIG. 6. The lever 66 is further formed with a handle portion 70 at the opposed end which is able to be grasped to pivot the latch release means 64 about the pivot pin 68 in a horizontal plane.

The first end 65 of the latch lever 66 is formed with a finger portion 72, illustrated in FIG. 3, which is adapted to engage the detent 56 on the latch member 52. In this manner, pivotal movement of the latch member 66 in a horizontal plane will cause the finger 72 to engage the detent 56 in the latch member 52 causing pivotal movement of the latch member 52 in a clockwise direction, as viewed in FIG. 4, which disengages the latch member 52 from the stop pin 62 and releases the seat back support frame 24 for pivotal movement. When the latch release means 64 is released, the biasing means 58 will bias the latch member 52 to the upright position illustrated in FIG. 4 such that the latch member 52 is in position to engage the stop pin 62 when the seat back support frame 24 is again moved to the first direction facing position along the rear edge of the seat bottom support frame 22.

As illustrated in FIG. 3, for wider seats, a pair of identical latch means 50 are provided on opposed sides of the seat bottom support frame 22. The latch means 50 are interconnected by a tie rod 74 which interconnects the first end 65 of the latch levers 66 for unitary pivotal movement of both latch levers 66 in a horizontal plane. Thus, when one of the latch members 66 is pivoted, both latch means 50 are released from the respective stop pins 62.

The vehicle seat 10 of the present invention is further provided with angular adjustment means, denoted in general by reference number 80, which enables the seat back support frame 24 to be angularly positioned with respect to the seat bottom support frame 22. Any conventional seat adjustor mechanism may be used to provide the desired angular adjustment of the seat back with respect to the seat bottom of the vehicle seat 10 of the present invention. By way of example, and not limitation, the angular adjustment means 80 comprises a seat back adjustor mechanism sold by Keiper Automotive under the tradename "THE TAUMEL-SYSTEM".

This type of seat back adjustor mechanism includes first and second bracket members 82 and 84 which are interconnected at first ends by an adjustable lock mechanism 86. The first or upper bracket 82 is secured at an upper end, by suitable means, such as fasteners or welding, to the side of the seat back support frame 24. The outer end of the second or lower bracket 84 is pivotally connected by pivot pin 88 to an intermediate portion of the link 44.

The lock mechanism 86 comprises a hand wheel 90 which drives an eccentric bolt mounted on an inner gear rim whose teeth engage corresponding teeth and valleys in an outer gear rim. The outer gear rim is mounted on a backing plate 92, FIG. 5, which is secured to the upper bracket 82 and operates to rotate the upper bracket 82 and seat back support frame 24 connected thereto as the hand wheel 90 is rotated in either clockwise or counter-clockwise directions. As there are a plurality of teeth in the inner and outer gear rims, a plurality of angular positions of the seat back support frame 24 may be selected with respect to the seat bottom support frame 22. In all positions, the seat back 24 is locked in a secure position with respect to the seat bottom support frame 22.

As shown in FIG. 3, two angular adjustment means 86 are provided, each on opposed sides of the vehicle seat 10. One of the adjustment means 86 is provided with the hand wheel 90 and the opposed adjustment means 86 is operated as a slave unit which does not include the hand wheel 90. An interconnecting force transmitting rod 94 is secured at opposed ends to the eccentric bolt in each angular adjustment means 86 such that rotation of one of the angular adjustment means 86 causes a corresponding identical amount of rotation of the opposed angular adjustment means 86.

As shown in FIGS. 1, 3 and 4, the seat back is oriented in a first direction facing position, which, in a normal vehicle configuration, would be the forward facing direction in the vehicle. If it is desired to convert the vehicle seat 10 to a rearward facing direction, the latch release means 64 is pivoted in a horizontal plane to disengage the latch means 60 from the stop pin 62 such that the seat back support frame 24 may be pivoted from the position illustrated in FIGS. 3 and 4 to the opposed position illustrated in FIG. 7, which is the opposed second direction facing or rearward facing direction when the vehicle seat 10 is mounted in a vehicle.

Pivotal movement of the seat back support frame 24 towards the second or rearward facing direction will terminate when the stop pin 62 abuts the upper surface of the side support frame member 36 of the seat bottom support frame 22. The angular position of the seat back support frame 24 with respect to the seat bottom support frame 22 may then be adjusted by selectively rotating the angular adjustment means 80 as described above. It should be noted that when the seat back support frame 24 is in the second or rearward facing direction position, the seat back support frame 24 is not latched in a fixed position with respect to the seat bottom support frame 22. However, a secure latch interconnection between the seat bottom and seat back support frames 22 and 24 is not required since any forces generated during a vehicular accident will tend to urge the seat back support frame 24 toward the front of the vehicle which would not collapse the seat back and thereby endanger the occupants of the vehicle seat 10.

The vehicle seat 10 of the present invention may also be angularly moved to a bed position in which the seat back support frame 24 is oriented in a horizontal position substantially in line with the seat bottom support frame 22. To attain this configuration, the forwardmost vehicle seat 10, as illustrated in FIGS. 1 and 2, is initially positioned in the first forward facing direction position. The latch means 50 is then disengaged from the stop pin 62 by pivoting the latch release means 64, as described above, and the seat back support frame 24 is urged counter-clockwise until a second stop means 63 in the form of a stop pin mounted on the link 44 engages the upper surface of the side support frame member 36 of the seat bottom support frame 22 as illustrated in FIG. 8. The seat back support frame 24 may then be lowered to a substantially horizontal position by selectively rotating the angular adjustment means 80.

In order to form an elongated bed comprised of two horizontally aligned seats 10 and 12, as shown in FIG. 2, slight modification to the basic configuration of the vehicle seat described above must be made to the rearmost positioned seat 12. The rearmost vehicle seat 12 is substantially identical to vehicle seat 10 described above and illustrated in FIGS. 3 and 4 except that the orientation of the rearmost seat 12 is reversed 180° from that illustrated in FIG. 3. The latch means 50 are positioned adjacent the rear edge of the seat bottom support frame 22 of the rearmost vehicle seat 12 in order to securely latch the seat back support frame 24 in the first forward facing position.

When it is desired to lower the seat back of the rearmost seat 12 to the horizontal bed position, as depicted in FIG. 2, the latch means 50 is released, as described above, and the seat back support frame 24 is pivoted toward the forward edge of the seat bottom 20 until the second stop pin 63 engages the upper surface of the seat bottom support frame in the same manner as that depicted in FIG. 8 for the forwardmost seat 10. The angular adjustment means 80 is then rotated to lower the seat back support frame 24 and seat back 18 affixed thereto to a horizontal aligned position with its corresponding seat bottom 20. In this position, the seat back 18 of the rearmost vehicle seat 12 will be substantially in line and abutting the seat back 14 of the forwardmost vehicle seat 10, as shown in FIG. 2, to form an elongated bed.

Thus, there has been disclosed a unique convertible and adjustable seat which is ideally suited for use in vehicles, such as motor homes, campers, vans, etc. The vehicle seat is convertible such that the seat back may be pivotally moved between opposed first and second direction facing positions and includes a latch mechanism which latches the seat back in a fixed position when it is disposed in the first direction facing position. Furthermore, the vehicle seat of the present invention includes an angular adjustment mechanism which enables the angular position of the seat back to be selectively adjusted with respect to its corresponding seat bottom between a variety of upright positions and a horizontal aligned bed position.

The vehicle seat of the present invention provides such convertible and adjustable features by means of a simplified mechanism requiring relatively few components which contributes to a reduced manufacturing cost and a vehicle seat which requires a minimum amount of interior space within a vehicle.

What is claimed is:

1. A seat comprising:
   first and second seat members;
   the first seat member being adapted to be mounted to the floor of a vehicle;
   means for pivotally interconnecting the first and second seat members such that the second seat member may be selectively moved between the first and second opposed direction facing positions along opposed ends of the first seat member, the interconnecting means including single first and second links each disposed on opposite sides of the first and second seat members and having first and second ends, the first and second links being pivotally connected to the first seat member at a first end and to the second seat member at a second end;
   means, associated with at least one of the first and second links for adjusting the angular relationship of the second seat member with respect to the first seat member in each of the first or second direction facing positions; and
   latch means, mounted on the first seat member, for latching at least one of the first and second links and the second seat member in a fixed position when the second seat member is oriented in the first direction facing position.

2. The seat of claim 1 further including:
   first stop means, mounted on the link and engageable with the latch means, for stopping pivotal movement of the second seat member at a first forward facing position.

3. The seat of claim 2 wherein the angular adjustment means comprises:
   first and second brackets, the first bracket connected to the link and the second bracket connected to the second seat member; and
   adjustable lock means for selectively locking the first and second brackets in any one of a plurality of angular positional relationships.

4. The seat of claim 2 wherein the latch means comprises:
   a latch member pivotally connected to the first seat member, the latch member having a notch formed at an upper end adapted to engage the first stop means when the second seat member is oriented in a first direction facing position;
   means for biasing the latch member to an upright position to engage the first stop means; and
   latch release means, mounted on the first seat member and engaging the latch member, for moving the latch member out of engagement with the first stop means.

5. The seat of claim 2 further including second stop means mounted on the link for limiting movement of the second seat member with respect to the first seat member at a horizontal position in line with the first seat member.

6. A seat comprising:
   first and second seat members, mounted on first and second support frames, respectively;
   single first and second links mounted on opposed sides of the first and second seat member support frames, respectively, for pivotally interconnecting the first and second seat members such that the second seat member may be selectively moved between first and second opposed direction facing positions along opposed ends of the first seat member;
   first and second means, respectively associated with the first and second links, for adjusting the angular relationship of the second seat member with respect to the first seat member in each of the first or second direction facing positions, the first and second angular adjustment means being interconnected for unitary angular movement; and first and second latch means, mounted on opposed sides of the first support frame of the first seat member, for latching the first and second links and the second seat member in a fixed position when the second seat member is in the first direction facing position, the first and second latch means being interconnected for simultaneous movement.

* * * * *